(12) United States Patent
Sato (10) Patent No.: US 6,408,435 B1
(45) Date of Patent: Jun. 18, 2002

(54) INTERNET DOWNLOADED PROGRAMMABLE REMOTE CONTROL

(75) Inventor: Kazuhiro Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/840,368

(22) Filed: Apr. 29, 1997

(30) Foreign Application Priority Data

Apr. 30, 1996 (JP) .............................................. 8-132717

(51) Int. Cl.$^7$ .............................................. H04N 5/445
(52) U.S. Cl. .......................... 725/58; 725/38; 348/460; 348/734
(58) Field of Search .............................. 725/38, 61, 87, 725/58, 100; 348/460, 731, 734

(56) References Cited

U.S. PATENT DOCUMENTS

| | | | | |
|---|---|---|---|---|
| 4,809,325 A | * | 2/1989 | Hayashi et al. ................ 380/20 |
| 5,323,234 A | * | 6/1994 | Kawasaki ....................... 348/6 |
| 5,410,326 A | | 4/1995 | Goldstein | |
| 5,446,488 A | * | 8/1995 | Vogel ............................. 348/3 |
| 5,465,385 A | * | 11/1995 | Ohga et al. ................... 455/6.1 |
| 5,517,254 A | * | 5/1996 | Monta et al. ................ 348/569 |
| 5,517,256 A | * | 5/1996 | Hashimoto ................... 348/731 |
| 5,532,361 A | * | 7/1996 | Lee ............................. 348/731 |
| 5,686,954 A | * | 11/1997 | Yoshinobu et al. ........... 348/13 |
| 5,751,672 A | | 5/1998 | Yankowski ................... 369/30 |
| 6,025,837 A | * | 2/2000 | Matthews, III et al. ..... 345/327 |

FOREIGN PATENT DOCUMENTS

| | | |
|---|---|---|
| EP | 0 639 030 A | 2/1995 |
| WO | WO 90/00847 A | 1/1990 |
| WO | WO 93/11638 | 6/1993 |
| WO | WO 94/14280 A | 6/1994 |
| WO | WO 94/29811 A | 12/1994 |
| WO | WO 95/01058 A | 1/1995 |

* cited by examiner

Primary Examiner—Victor R. Kostak
(74) Attorney, Agent, or Firm—Frommer Lawrence & Haug LLP; William S. Frommer; Darren M. Simon (57) ABSTRACT

In a system, tabulated information on broadcasting programs is supplied through a network. When a user selects information on a desired program from the tabulated information of programs, supplemental information attached to the individual program information is converted into an remote control signal to remote-control a user's receiver to receive the desired program.

17 Claims, 13 Drawing Sheets

| COMMAND | MODES |
|---|---|
| 00H | VTR STOP |
| 01H | VTR REPRODUCE |
| 02H | VTR REWIND |
| 03H | VTR FAST-FORWARD |
| 04H | VTR RECORD |
| 05H | VTR POWER |
| 06H | G CODE 0 |
| 07H | G CODE 1 |
| 08H | G CODE 2 |
| 09H | G CODE 3 |
| 0AH | G CODE 4 |
| ⋮ | ⋮ |
| 10H | TV POWER |
| 11H | TV CH1 |
| 12H | TV CH2 |
| 13H | TV CH3 |
| 14H | TV CH4 |
| ⋮ | ⋮ |
| 20H | MD STOP |
| 21H | MD REPRODUCE |
| 22H | MD RECORD |
| ⋮ | ⋮ |
| 50H | AIR CONDITIONER ON |
| 51H | AIR CONDITIONER OFF |

| ADDRESS | CODE DATA | | |
|---|---|---|---|
| A0 | MAKER A VTR | 1985 ~ 1990 | VTR STOP |
| A1 | | | VTR REPRODUCE |
| A2 | | | VTR REWIND |
| A3 | | | VTR FAST-FORWARD |
| A4 | | | VTR RECORD |
| A5 | | | VTR POWER |
| A6 | | | G CODE 0 |
| A7 | | | G CODE 1 |
| A8 | | | G CODE 2 |
| A9 | | | G CODE 3 |
| A10 | | | G CODE 4 |
| ⋮ | | | ⋮ |
| A20 | MAKER A VTR | 1990 ~ | VTR STOP |
| A21 | | | VTR REPRODUCE |
| ⋮ | | | ⋮ |
| A40 | MAKER B VTR | 1990 ~ | VTR STOP |
| A41 | | | VTR REPRODUCE |
| ⋮ | | | ⋮ |
| ⋮ | ⋮ | ⋮ | ⋮ |
| A100 | MAKER A TV | 1985 ~ 1990 | TV POWER |
| A101 | | | TV CH1 |
| A102 | | | TV CH2 |
| ⋮ | | | ⋮ |

Fig. 10A

```
SELECT DEVICE

1.  VTR
2.  TV
3.  MD PLAYER
4.  ANP
```

Fig. 10B

```
SELECT MAKER

DATE OF FABRICATION

INTERNET DOWNLOADED PROGRAMMABLE REMOTE CONTROL

BACKGROUND OF THE INVENTION

1. Field of the Invention

This invention relates to a remote controller suitable for use in operating VTR (Video Taper Recorder/Player) and other audio/visual devices and, in particular, to a remote controller suitable for use in a system for transmitting broadcast program reservation tables through a computer network.

2. Related Art

VTRs are equipped with program reservation function to automatically record a program of a selected channel when the preset time comes. A user can use the program reservation function very conveniently to record a desired program also during his absence. For program reservation in a conventional VTR, users had to personally enter the record start time, record end time and the channel of a desired program. It was a very complex and time-wasting job for users. To cope with the problem, a new system has been proposed, which enables program reservations only by entering a so-called Gemstar code (hereinbelow called G code) assigned to an individual program. Users can conveniently use this system to easily set the start time, end time and channel of a desired program by simply entering a code shown on newspapers or magazines.

However, program reservation with conventional VTRs, either by individually entering the start time, end time, channel and other materials of the program or by simply entering a code, is based on a program schedule on newspapers, magazines or other publications, and cannot cope with any change in broadcast programs.

In case of play-by-play broadcasting of baseball games, for example, the games often continue beyond scheduled sections of time, and subsequent programs are often deferred by several minutes to several hours. Conventionally, if the start time of a desired broadcast program is changed, users must reset program reservation after canceling the former reservation.

Another situation to be considered is that channels have been increased remarkably along with recent development of CATV (CAble TeleVision) and satellite broadcasting. Newspapers and magazines cannot afford to print all programs of all channels. Some of CATV channels are local broadcast channels, and some are specialized channels for specific audience. Currently, newspapers and magazines are not prepared for providing information on all programs of these local channels and specialized channels.

On the other hand, there is a known system called EPG (Electric Program Guide) system which superposes a program table on electric waves transmitted from broadcasting stations such that users, on the part of receivers, can extract the program table on their displays and can select and reserve desired programs. The EPG system is known from, for example, U.S. Pat. No. 4,706,121. Since, however, the EPG system is not a reciprocal transmission, even when the time of a reserved program is deferred due to elongation of a preceding program, such as play-to-play broadcasting of a baseball game, the EPG system cannot cancel the reservation and automatically starts recording of the program.

Satellite broadcasting often extends the service area beyond a single country. It is difficult for newspapers and magazines to supply information on programs of such borderless satellite broadcasting to audience all over the service area. Also the EPG system has a difficulty in providing services all over the service area beyond a single country.

SUMMARY OF THE INVENTION

It is therefore an object of the invention to provide a remote control device easily operated for reservation, etc. of programs, and flexibly coping with changes in schedule of programs.

Another object of the invention is to provide a remote control device facilitating reservation of programs regardless of an increase in broadcasting channels and an increase in service area.

Another object of the invention is to provide a remote control device capable of jointly controlling audio visual systems and electronic device systems.

According to the invention, there is provided a remote control device comprising:
  a receiver for receiving information on programs transmitted through a transmission line;
  a display for displaying tabulated program information received by the receiver;
  a program reserve information demand portion transferring through the transmission line a command of demanding program reserve information corresponding to desired program information among the tabulated program information displayed on the display; and
  a control signal generator for generating a control signal to control an electronic device in response to the program reserve information demanded by the program reserve information request portion and received at the receiver through the transmission line.

According to another aspect of the invention, there is provided a transmitter-receiver device comprising;
  a transmitter for transmitting tabulated program information in response to a user's demand transmitted from a transmission line; and
  a receiver for receiving through the transmission line a demand for program reserve information corresponding to desired program information designated by a user among the tabulated program information, said transmitter transmitting the demanded program reserve information in response to the demand for the program reserve information received by the receiver.

According to another aspect of the invention, there is provided a transmitting and receiving method comprising the steps of:
  transmitting tabulated program information in response to a user's demand sent through a transmission line;
  receiving the demand for program reserve information corresponding to desired program information designated by the user among the tabulated program information; and
  transmitting designated program reserve information in response to the demand for program reserve information in receipt.

DESCRIPTION OF THE PREFERRED EMBODIMENTS

Figure 1:
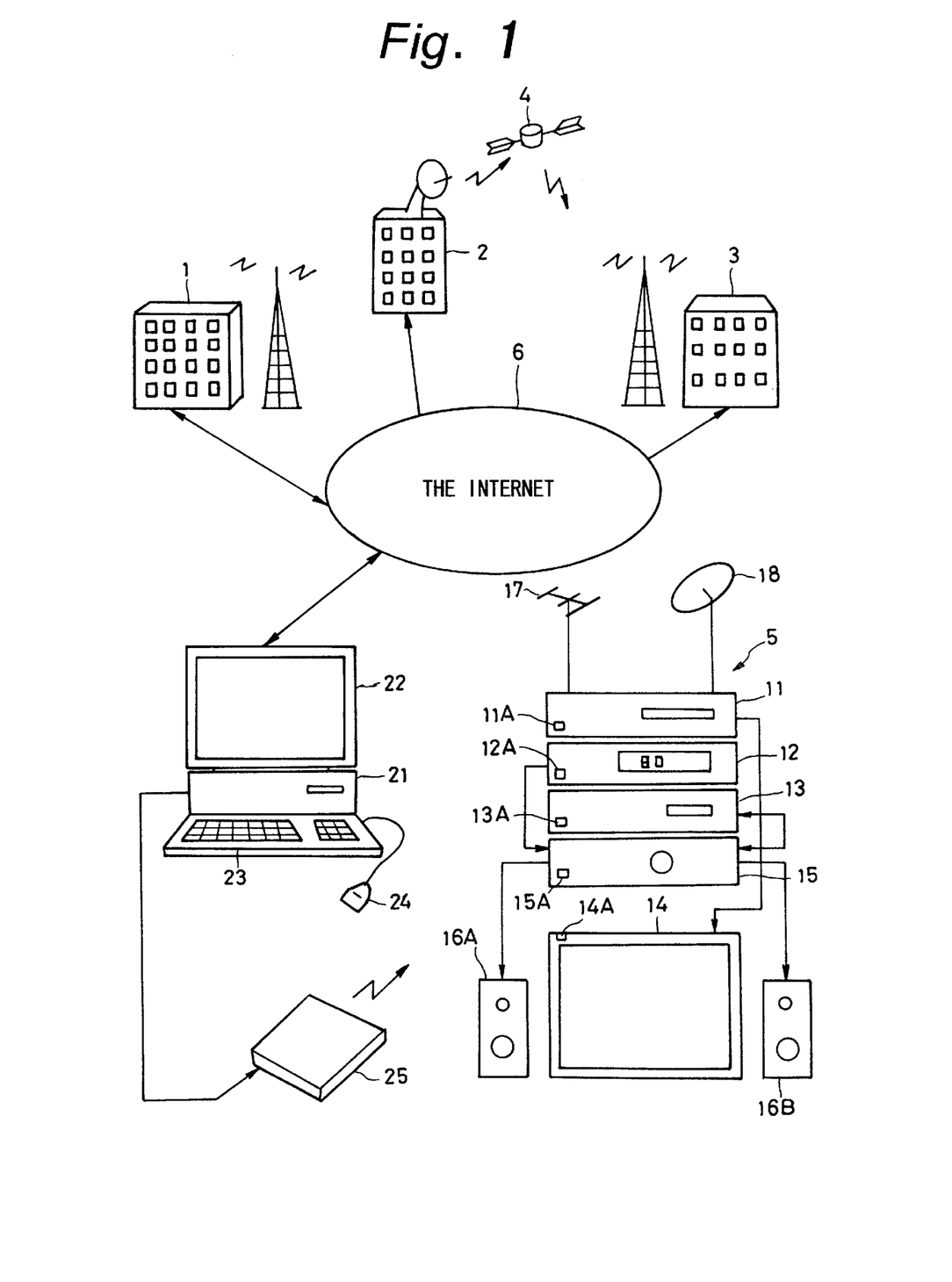
FIG. 1 is a block diagram of the entirety of a network system to which the invention is applied.

Explained below some embodiments of the invention with reference to the drawings. FIG. 1 shows a system to which the invention is applied. In FIG. 1, numeral 1 refers to a surface wave TV broadcasting station, 2 to a satellite TV broadcasting station, and 3 to an FM radio broadcasting station.

The surface wave TV station 1 broadcasts TV programs to the public, using VHF (Very High Frequency) and/or UHF (Ultra High Frequency) bands. The satellite TV station 2 broadcasts TV programs to the public, using a satellite 4. Since satellite TV broadcasting can cover a wider service area, its service area may be beyond a single country. Additionally, satellite broadcasting prepares many channels, and some provide broadcasting for limited audience. The FM radio station 3 broadcasts FM radio programs to the public. The FM radio station 3 may be a small-scaled local station that broadcasts local affairs with a low electric power. The system may also include a CATV TV station (not shown).

Numeral 5 denotes an audio/visual system 5. In this example, the audio/visual system 5 each family owns includes VTR 11, FM tuner 12, MD (Mini Disc) player/recorder 13, TV receiver 14, audio amplifier 15, and speakers 16A, 16B. The VTR 11 having a satellite broadcasting tuner, FM tuner 12, MD (Mini Disc) player/recorder 13, TV receiver 14 and audio amplifier 15 have optical detectors 11A, 12A, 13A, 14A and 15A, respectively, to be remotecontrolled by infrared signals.

A TV signal transmitted from the surface TV station 1 is received at an antenna 17 of the audio/visual system 5. Output of the antenna 17 is supplied to VTR 11 and TV receiver 14, and images based on the TV signal from the surface TV station 1 are displayed on the TV receiver 14. The TV signal from the surface TV station 1 can be recorded on a magnetic tape in VTR 11.

A TV signal transmitted from the satellite TV station 2 via the satellite 4 is caught by a parabola antenna 18 of the audio/visual system 5. Output of the parabola antenna 18 is frequency-converted into a satellite medium frequency by a converter (not shown), and supplied to VTR 11 and TV receiver 14. Images based on the TV signal from the satellite TV station 2 via the satellite 4 are displayed on the TV receiver 14. The TV signal can be recorded on a magnetic tape in VTR 11.

A radio broadcast signal transmitted from the FM radio station 2 is received at the FM tuner 12. Output of the FM tuner 12 is supplied to the audio amplifier 15. Output of the audio amplifier 15 is output from the speakers 16A and 16B. The audio signal based on the broadcast signal from the FM radio station 2 can be recorded on a mini disc in the MD player/recorder 13.

In the system to which the invention is applied, the surface TV station 1, satellite TV station 2 and FM radio station 3 also provide information on scheduled programs by WWW (World Wide Web) through the internet 6. Thus, the stations can introduce scheduled programs not only in characters but also in still or moving images with or without voices.

In the system according to the invention, commands for selecting behaviors electronic devices can be provided on WWW pages. By making use of the commands on the WWW pages, a user or listener can easily reserve desired programs from program lists on WWW pages of individual stations.

Each family prepares its personal computer 21 connectable to the internet 6. Connected to the personal computer 21 are a display 22, keyboard 23 and mouse 24. Further attached to the personal computer 21 is an interface box 25 through an interface such as RS232C or SCSI, for example.

The interface box 25 generates an infrared signal in response to a command from the personal computer 22. The interface box 25 is disposed face to face with the VTR 11, FM tuner 12, MD player/recorder 13, TV receiver 14 and audio amplifier 15 so that the VTR 11, FM tuner 12, MD player/recorder 13, TV receiver 14 and audio amplifier 15 are set in desired modes of operation by infrared signals from the interface box 25.

An application called browser is installed in the personal computer 21 to see WWW pages connecting it to the internet 6 via a provider. When a viewer makes access to WWW sites managed by the stations 1, 2 and 3, using his personal computer 25 and the browser, and links his personal computer 25 to the WWW pages of the stations 1, 2 and 3, he can get information on broadcast programs of the stations 1, 2 and 3. The information is transmitted in form of hypertexts, and may include not only characters but also still or moving images, and voices as well.

In the system according to the invention, commands for selecting operation modes of electronic devices are provided on WWW pages. Users can use these commands to easily reserve desired programs by confirming schedules of programs on WWW pages.

Figure 2:
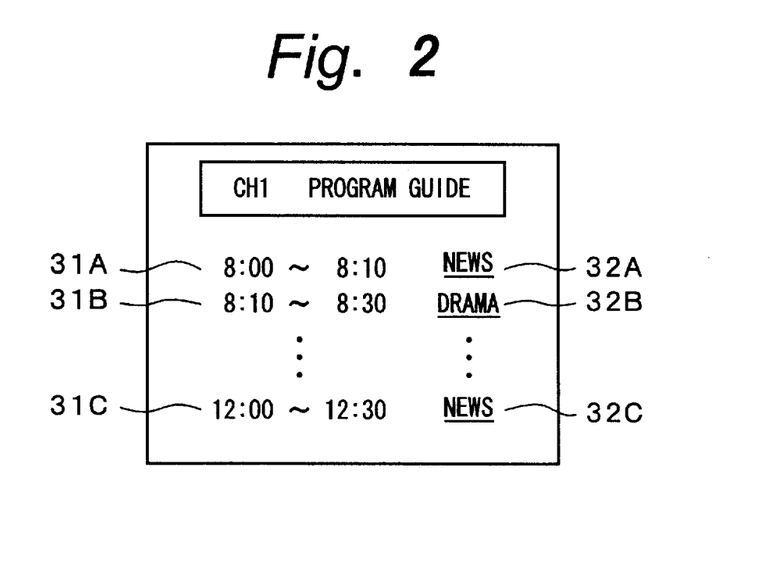
FIG. 2 is a diagram of a program guide shown on a display in a network system to which the invention is applied.

For example, when a user makes access to the WWW site of the surface wave station 1 by using his personal computer 21 and browser, the WWW page indicating the schedule of programs of the channel as shown in FIG. 2 is shown on the display of the personal computer 21. As shown in FIG. 2, the WWW page provides indication of time schedules 31A, 31B and 31C, and indication of contents 32A, 32B and 32C of the programs. Additionally, commands for recording the programs are attached to the titles of the programs 32A, 32B and 32C.

A viewer can confirm the schedule of programs of the day, looking at the WWW page on his personal computer 21, and may click the mouse 24 at the title of a desired program 32A, 32B or 32C. Responsively, an infrared signal instructing the VTR 11 to record the program at the indicated time is output from the interface box 25 in FIG. 1. Thus, the VTR 11 is set in the reserved mode for recording the program at the reserved time by the infrared signal.

Figure 3:
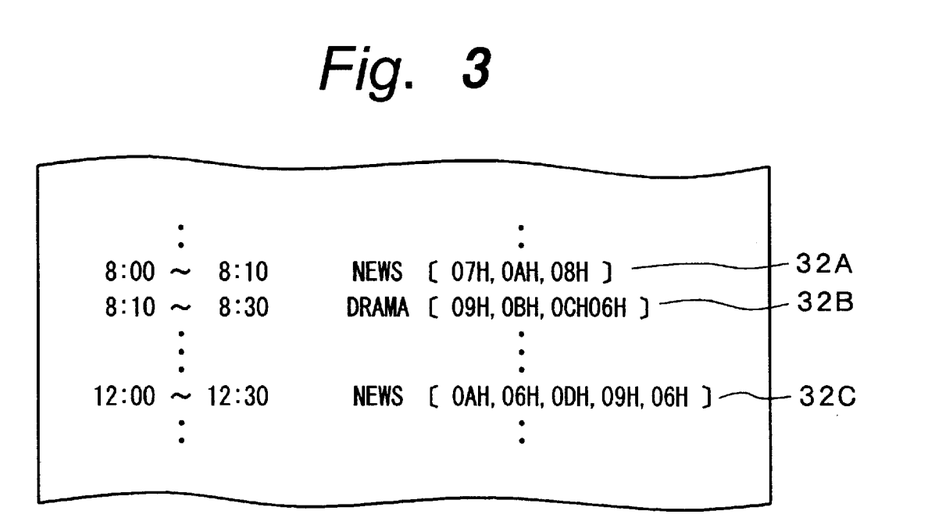
FIG. 3 is a schematic diagram for explaining G codes assigned to individual programs in a program guide shown on a display.

This is explained below in-greater detail. In the system according to the invention, WWW pages contain commands for determining behaviors of electronic devices. For example, the WWW page shown in FIG. 2 contains a description in form of a hypertext as shown in FIG. 3. Characters in parenthesis, 33A, 33B and 33C in FIG. 3 are commands for determining behaviors of electronic device. Script languages may be made by using these commands.

Figure 4:
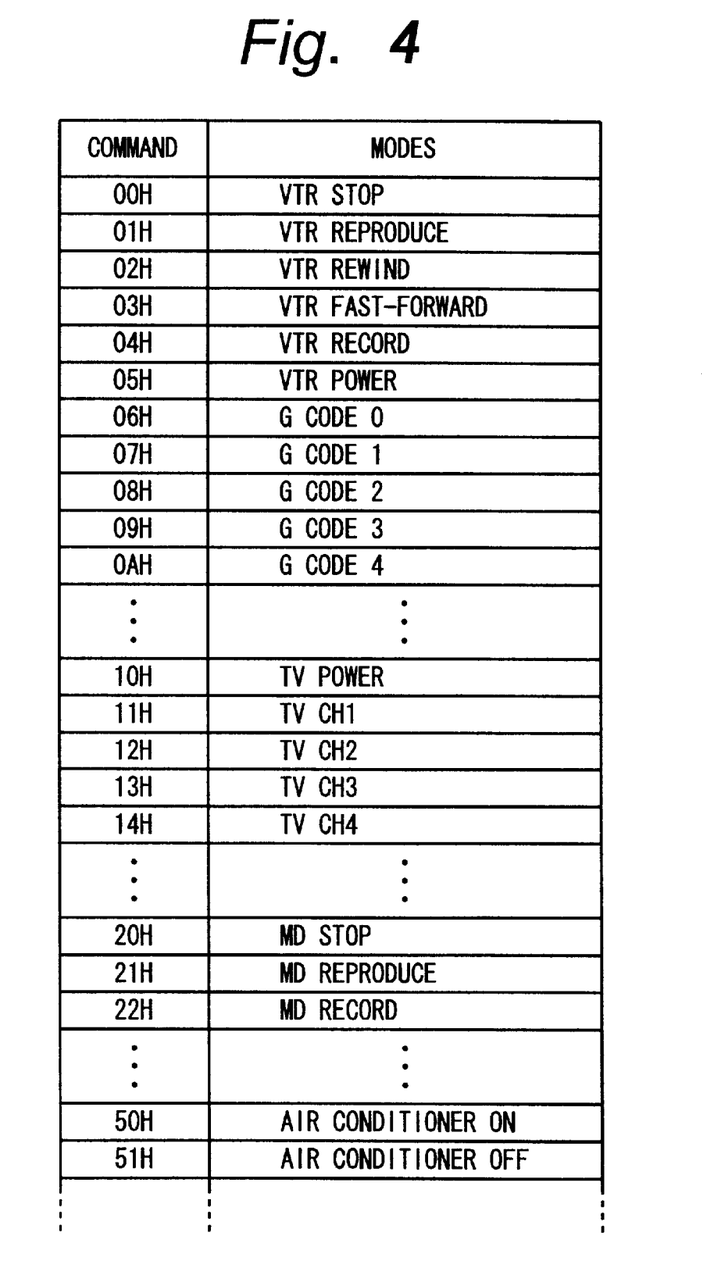
FIG. 4 is a table of various codes of a G code system and behaviors or modes corresponding to these codes.

FIG. 4 shows an example of such commands and their operations. As shown in FIG. 4, these commands define behaviors of VTR, TV receiver, MD player/recorder and other electronic devices. For example, a hexadecimal command [00H] makes VTR stop its operation, and another hexadecimal command [01H] sets VTR for operation. These commands can control behaviors not only of audio/visual devices such as VTR and TV receiver but also of other various kinds of electronic devices such as air conditioner and illuminators.

Figure 5:
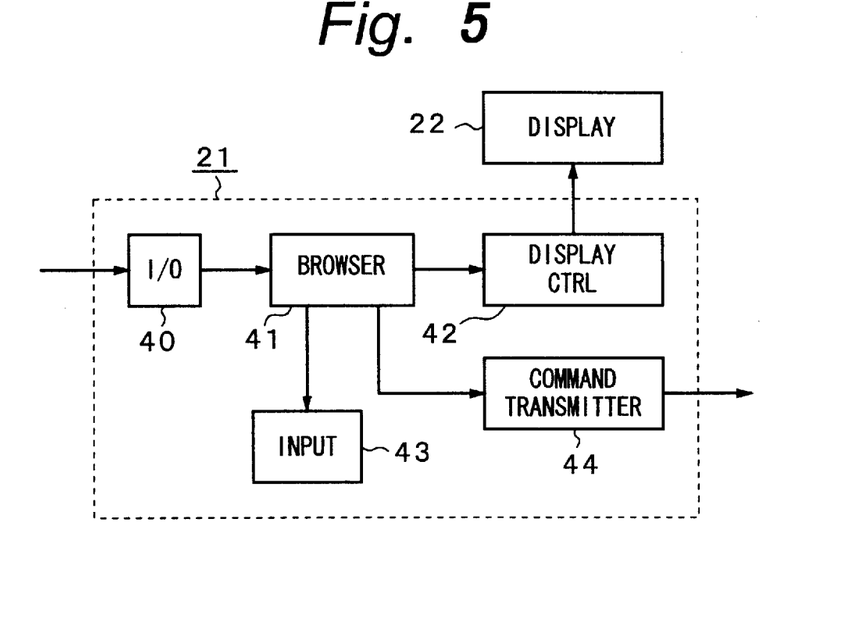
FIG. 5 is a block diagram of a receiver for decoding and displaying image information, character information and control signals that are transferred through a network.

As shown in FIG. 5 in a functional block diagram of the personal computer 21, when the personal computer 21 is connected to WWW sites of the stations 1, 2 and 3, it receives, through the interface 40, hypertexts containing commands for determining behaviors of electronic devices. Then, the browser application 41 installed in the personal computer 21 deals with the hypertexts to link text data, still or moving image data, audio data, and so forth, and to form a multimedia picture. The multimedia picture is shown on the display 22 by a display controller 42.

When commands for determining behaviors of electronic devices are contained in the hypertext, the browser application 41 arranges these commands in the picture.

For example, when the hypertext as shown in FIG., 3 is received, representation as shown in FIG. 2 appears on the display 22 under the control by the browser application 41. Commands 33A, 33B and 33C for determining behaviors of electronic devices are attached to the titles 32A, 32B, 32C of programs. Titles of programs attached with commands may be underlined so that viewers or listeners can identify the existence of these commands.

Figure 6:
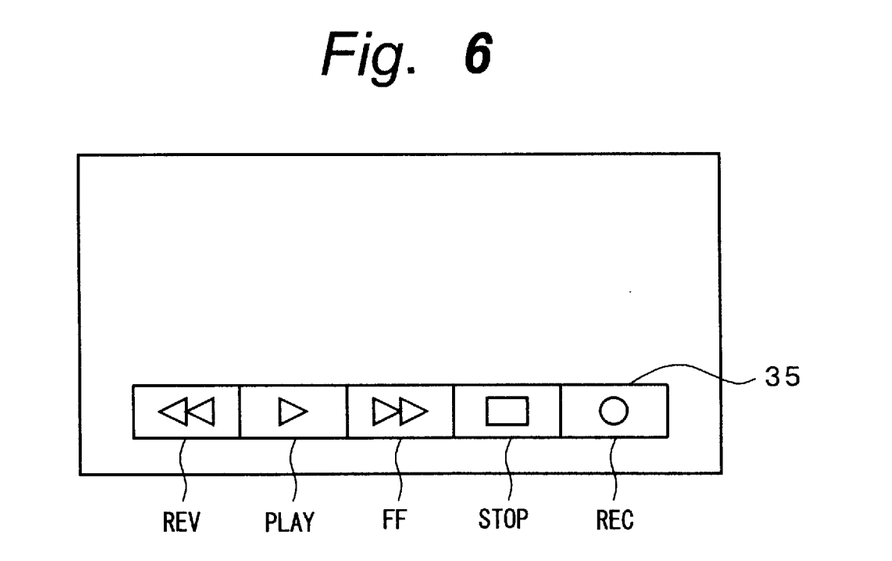
FIG. 6 is a schematic diagram of on-screen representation of various instructive keys for controlling an electronic device to be remotecontrolled.

Alternatively, portions containing commands may be shown in a color different from the other portions or in a different kind or different size of font to distinguish from others. It is also possible to show icons 35 indicating commands for determining behaviors of electronic devices as shown in FIG. 6.

In FIG. 5, when one of titles 32A, 32B, 32C containing commands is clicked by an input means 43 of a mouse or a keyboard, the command 33A, 33B or 33C attached to the title 32A, 32B or 32C is transmitted from a command transmitter 44 to the interface box 25.

Assume here that the title 32A in FIG. 2 is clicked. As shown in FIG. 3, the command 33A describing [07H, OAH, 08H] is attached to the title 32A. Therefore, when the title 32A is clicked, the attached command [07H, OAH, 08H] is transmitted to the interface box 25.

As shown in FIG. 4, the command [07H, OAH, 08H] is equivalent to a G code "142". Therefore, it results in transmitting the G code "142" to the interface box 25.

Figure 7:
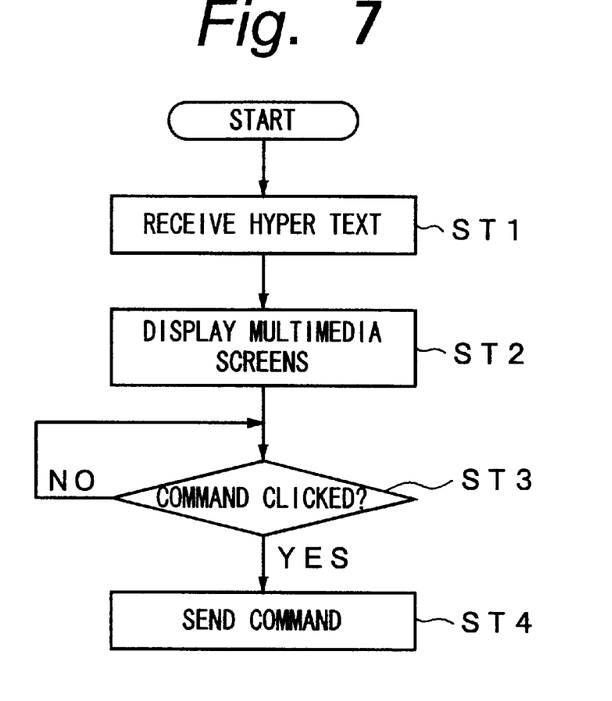
FIG. 7 is a flow chart of a process in a receiver for decoding and displaying image information, character information and control signals sent through a network.

FIG. 7 is a flow chart of a process of jobs in the personal computer 21. As shown in FIG. 7, in receipt of a hypertext containing commands for determining behaviors of electronic devices (step ST1), a multimedia picture with a text and still or moving images linked together is displayed under the control by the browser application 41 (step ST2). Next detected is whether any title portion with a command is clicked or not (step ST3). If any title portion is clicked, its command is transmitted to the interface box 25 (step ST4).

The interface box 25 converts the received command into an infrared signal acceptable for the type of each electronic device, and transmits it to the VTR 11, FM tuner 12, MD player/recorder 13, TV receiver 14 and audio amplifier 15 of the audio/visual system 5. Thus, the respective devices are set in desired modes of operation.

For example, when the title 32A in FIG. 2 is clicked, the command [07H, OAH, 08H] attached to the title is received at the interface box 25. The interface box 25 converts the command into an infrared signal equivalent to the G code "142" for VTR 11, and transmits the infrared signal to VTR 11. As a result, VTR 11 is set for "142" or the G code system.

Figure 8:
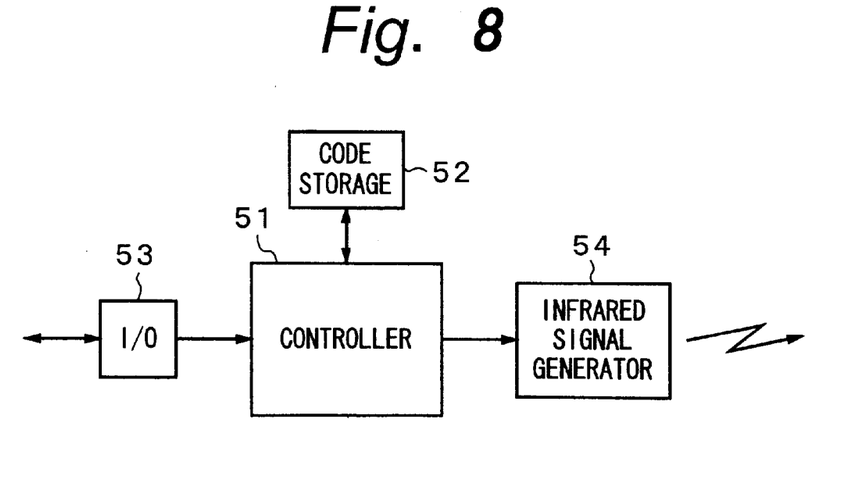
FIG. 8 is a block diagram of a transmitter for converting program reserve information sent through a network into a remote control signal acceptable in a user's electronic device and for transmitting it.
Figure 9:
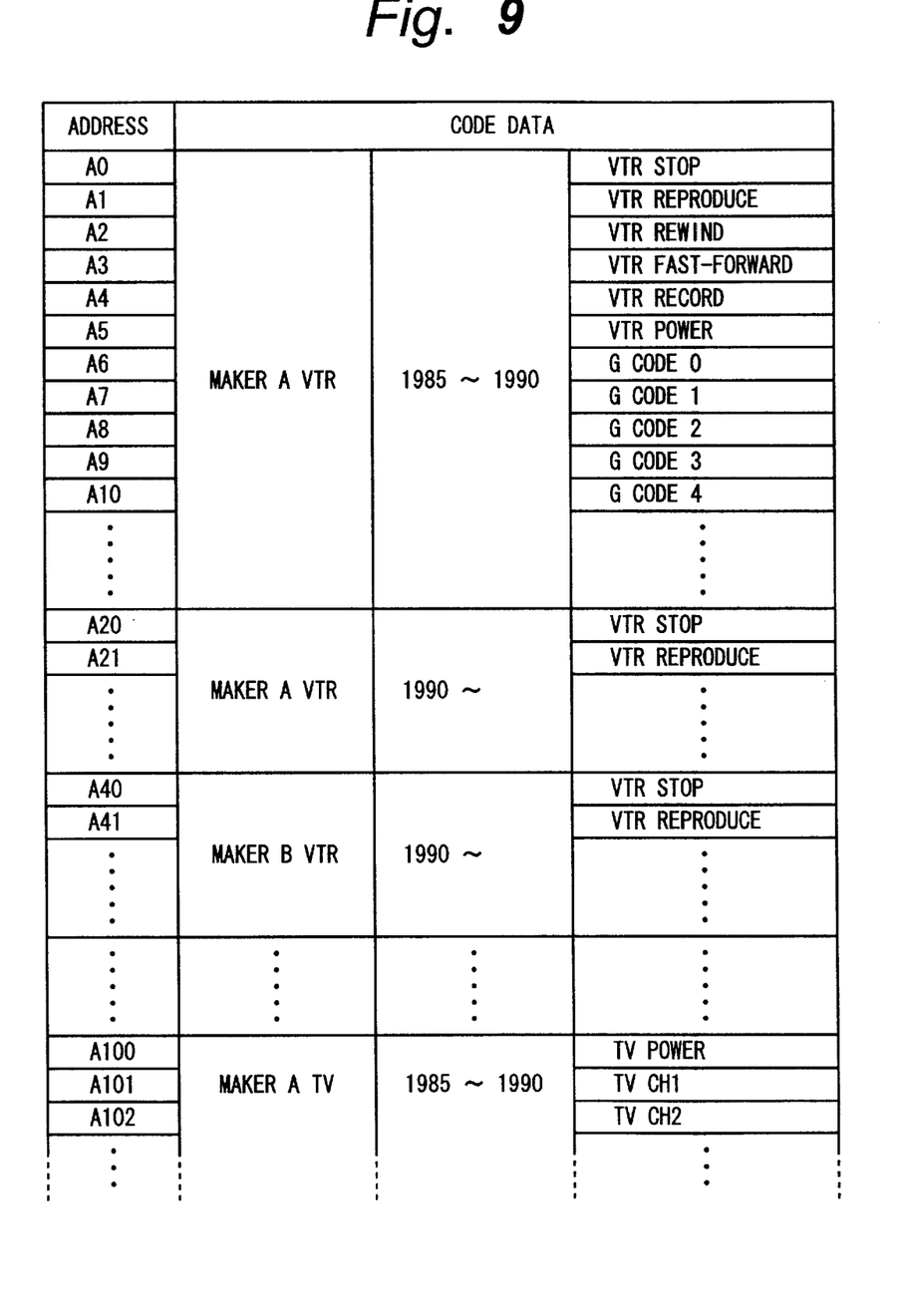
FIG. 9 is a table of code data for various kinds of devices of various makers, which are stored in code storage 52.

FIG. 8 shows a construction of the interface box 25. As shown in FIG. 8, the interface box 25 has a code storage portion 52. As shown in FIG. 9, the code storage portion 52 stores code data (information on codes and carriers) of infrared signals for difference devices of different manufacturers. That is, codes and carriers used for controlling electronic devices with infrared signals are different among manufacturers. Even for devices from the same manufacturer, codes and carriers are often different among types of devices and those having different fabrication dates. The code storage portion 52 stores all code data of all devices of different manufacturers as shown in FIG. 9.

In FIG. 8, a command prepared on a WWW page for setting electronic devices in desired modes of operation is sent from the personal computer 21 to the interface box 25. The command is applied to a controller 51 via an interface 53. The controller 51 interprets the command, and a corresponding code data is read out from the code storage portion 52. Output from the code storage portion 52 is supplied to an infrared signal generator 54 which, in turn, generates an infrared signal of the code and carrier determined by the code data.

As referred to above, codes and carriers for controlling electronic devices are different among different manufacturers and even among different devices from the same manufacturer depending on types and dates of fabrication. On the other hand, commands sent to the interface box 25 determine respective modes of operation of devices commonly to all devices regardless of manufacturers or types. Therefore, interpretation of commands and conversion of commands to codes and carriers acceptable for individual devices are required. Thus, the VTR 11, FM tuner 12, MD player/recorder 13, TV receiver 14 and audio amplifier of the audio/visual system 5 must be registered.

Registration of electronic devices may be done through the personal computer 21, for example. Registration may be made either upon installment of the audio/visual system or each time when a user sets his audio/visual devices in desired modes of operation, referring to on WWW pages. Also, the registration may be done on the part of the interface box 25.

Figure 10A:
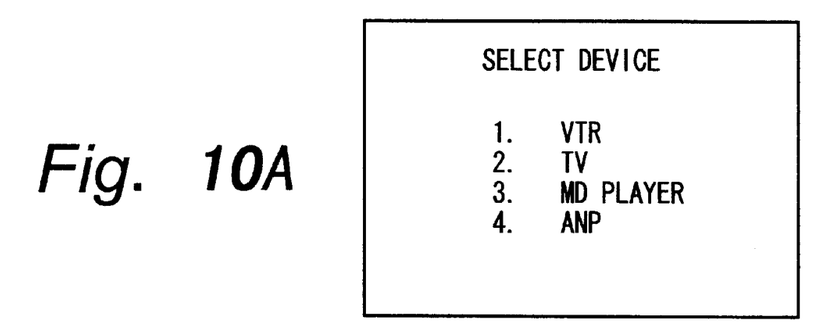
FIG. 10A is a diagram of a screen on which a user can select the model of his own electronic device.
Figure 10B:
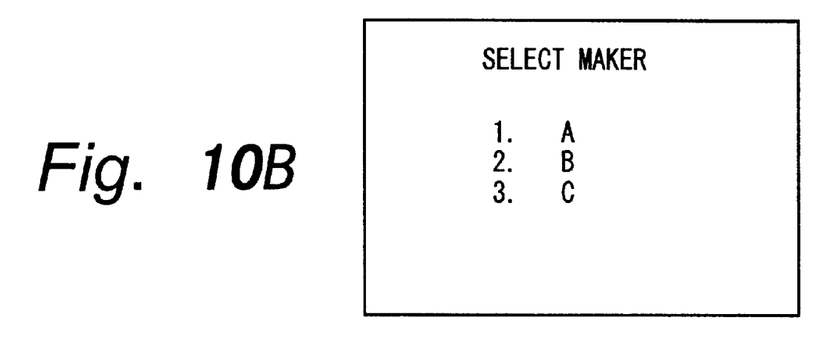
FIG. 10B is a diagram of a screen on which a user can select the manufacturer of his own electronic device.
Figure 10C:
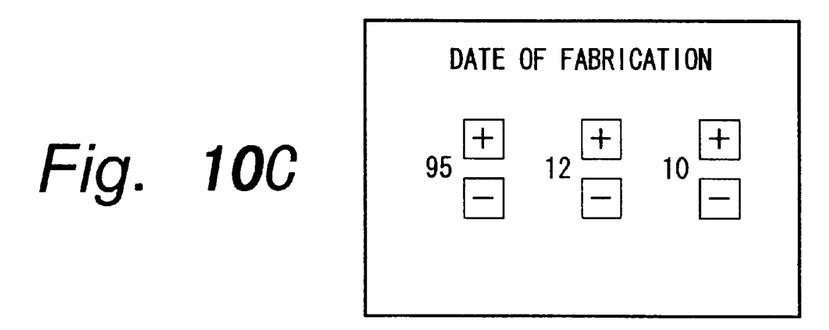
FIG. 10C is a diagram of a screen on which a user can enter the fabrication date of his own electronic device.

For registration of devices, a select-device menu is first displayed as shown in FIG. 10A. On the select-device menu, a user selects any device category among VTR, TV receiver, and others. Responsively, a select-maker menu listing different manufacturers appears on the screen as shown in FIG. 10B. After the user selects a manufacturer from the select-maker menu, a picture for entering a fabrication date appears as shown in FIG. 10C. When the user enters the fabrication date, maker information and information on the fabrication date on his device are introduced. Responsively, the introduced information is sent to and registered in the interface box 25.

Figure 11:
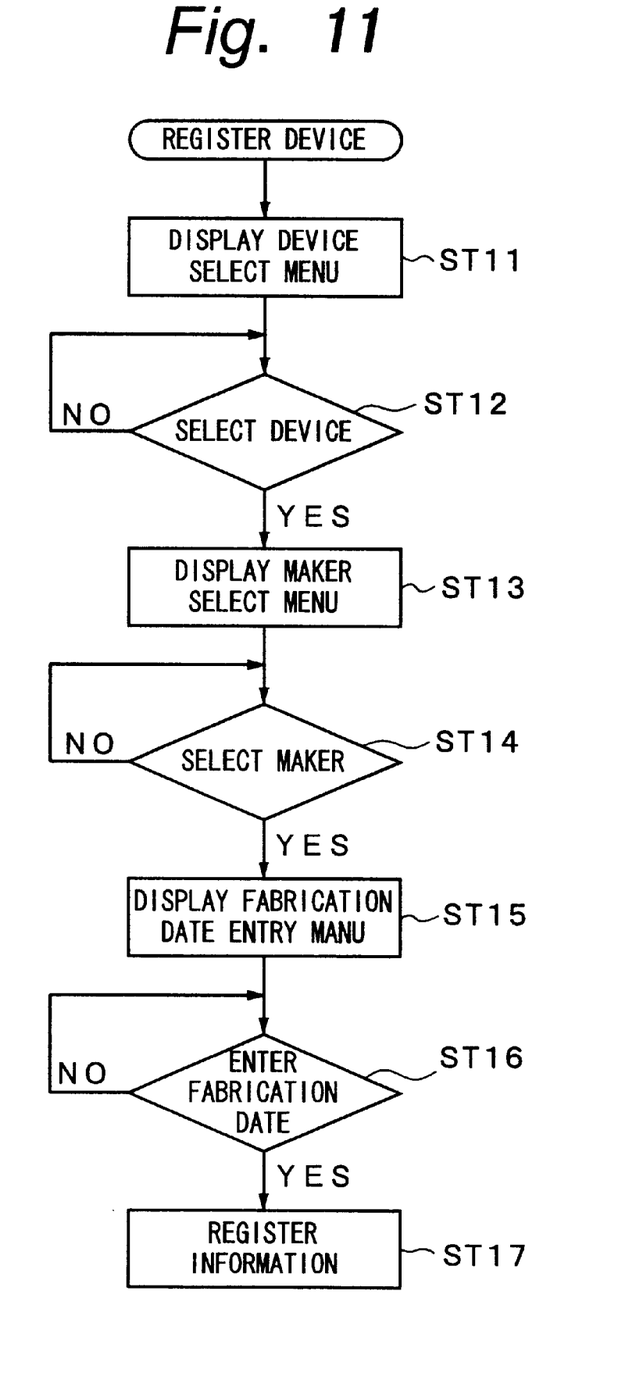
FIG. 11 is a flow chart of a process for a user to select and enter the model, manufacturer and fabrication date of his own electronic device.

FIG. 11 is a flow chart of jobs in this process. As shown in FIG. 11, upon registration of devices, the select-device menu is first displayed (step ST11). On this menu, it is checked whether VTR, TV receiver, MD player/recorder, or any other device is selected or not (step ST12). If any device is selected, then the select-maker menu is displayed (step ST13). On the select-maker menu, it is checked whether any maker A, B or C is selected or not (step ST14). If any maker is selected, the fabrication date entry menu is displayed (step ST15). On the fabrication date entry menu, it is checked whether any fabrication date is entered or not (step ST16). If any date is entered, all information given here on the maker and the fabrication date of the device is registered in the interface box 25 (step ST17).

Assume here that the VTR 11 of the audio/visual system 5 shown in FIG. 1 is a product fabricated by manufacturer A in a year from 1985 to 1990 and that the WWW page as shown in FIG. 2 is shown on the display 22 of the personal computer 21 and the title 32A on the WWW page is clicked. In this case, a command equivalent to "142" of the G code system is sent from the personal computer 21 to the interface box 25.

In case of the VTR manufactured by manufacturer A between years 1985 and 1990, the code data equivalent to "142" of the G code system is those registered in addresses "A7, A10, A8". Therefore, code data stored at addresses "A7, A10. A8" among others stored in the code storage portion 52 shown in FIG. 8 is read out.

The code data is sent to the infrared signal generator 54, and an infrared signal from the infrared signal generator 54 is transmitted to VTR 11. As a result, G code "142" is set in VTR 11.

Figure 12:
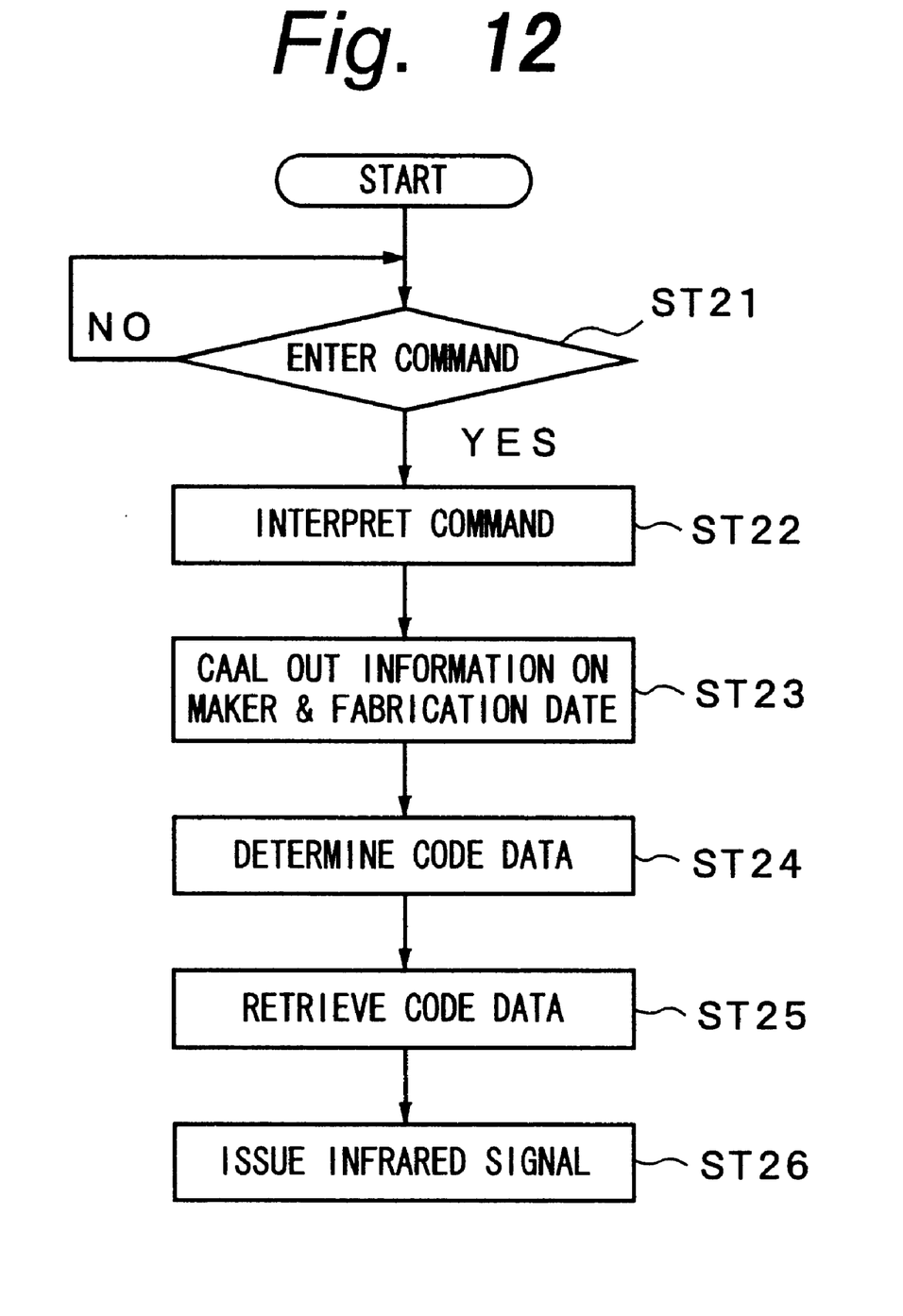
FIG. 12 is a flow chart of a process for generating a remote control signal acceptable in a user's electronic device in record.

FIG. 12 is a flow chart of responsive jobs in the interface box 25. As shown in FIG. 12, it is checked whether any command is sent from the personal computer 21 (step ST21). If any command is sent, then it is interpreted (step ST22), and data in record on manufacturers and fabrication dates of devices is retrieved (step ST23). Based on the information on makers and information on fabrication dates of devices, a particular code data corresponding to the mode of operation designated by the command is determined (step ST24), and then read out from the code storage portion 52 (step ST25). The data is transmitted in form of an infrared signal from the infrared signal generator 54 (step ST25).

Although the above example has been explained as the job of converting commands for determining behaviors of electronics device into infrared signal codes being shared by the interface box 25, the conversion may be done on the part of the personal computer 21.

In addition, although the above example has been explained as previously registering manufactures and fabrication dates of devices, if codes for individual demands on all devices are read out, prior registration of makers and fabrication dates of devices is not necessary.

Figure 13:
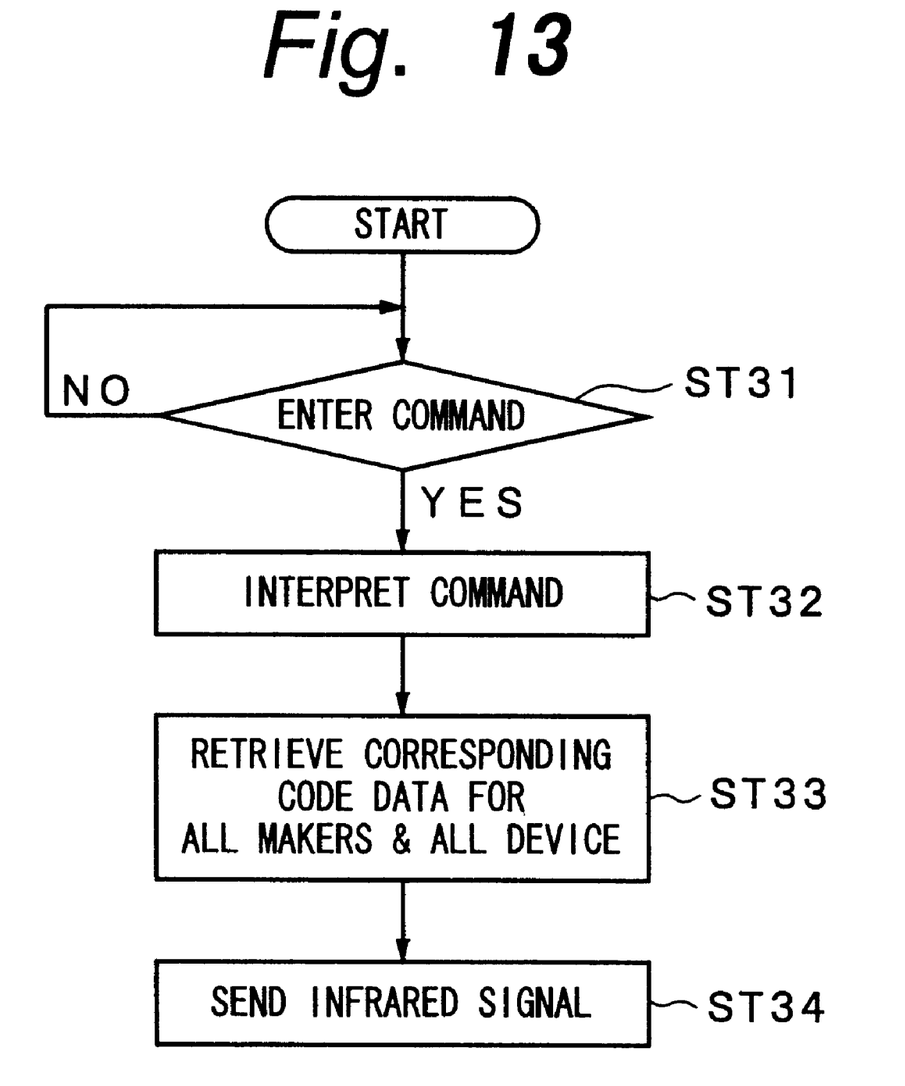
FIG. 13 is a flow chart of a process for sequentially transferring remote control signals to different kinds of devices of different manufacturers shown in FIG. 9.

More specifically, as shown in FIG. 13, it is checked whether any command is sent from the personal computer 21 (step ST31). If a command is sent, it is interpreted (step ST32). After that, code data defining jobs indicated by codes corresponding to the command for all devices of all manufacturers are read out sequentially (step ST33), and they are transmitted in sequence as infrared signals from the infrared signal generator 54 (step ST34). Since the sequentially transmitted code data for the command must contain the data for the device of the audio/visual system 5, when a user reads out code data for a desired mode of operation for all devices of all manufacturers, he can set his device for a desired mode of operation by selecting a corresponding data through a key, for example.

Since infrared signals have different code systems and carriers among different manufacturers, it seldom occurs that devices malfunction when codes for all devices of all manufacturers are read out sequentially.

In the above example, the code storage portion 52 previously stores all code data of all devices of all manufacturers. In this case, however, codes amount to an enormous volume, and infrared signal codes may be changed.

To cope this problem, the code storage portion may be configured to do both reading and writing so as to introduce code data entered from the exterior as a leaning remote controller.

Figure 14:
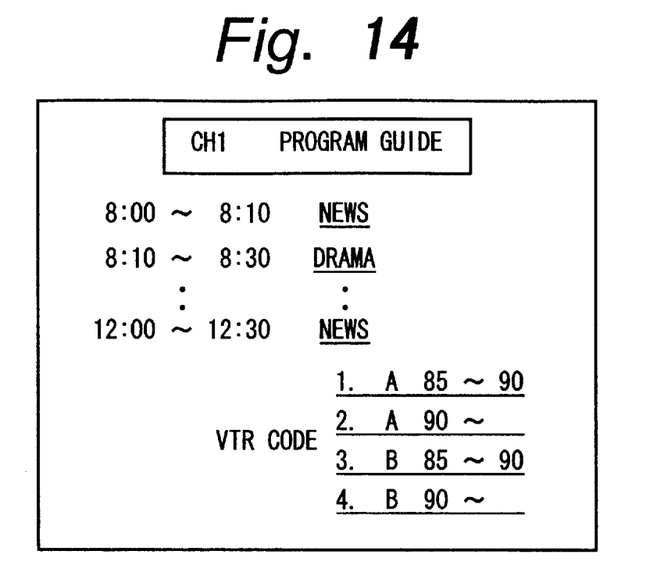
FIG. 14 is a diagram of a second example of program guide shown on a display in a network system to which the invention is applied.

Alternatively, code data may be transferred by WWW of the internet. For example, as shown in FIG. 14, indication 36 on manufactures and fabrication dates of VTRs is put on a WWW page for program guide. Attached to the indication 36 are commands for introducing code data for individual devices of individual manufacturers. If a VTR of a particular manufacturer having a particular fabrication date is selected from the indication 36, then a code data for the type of devices is down-loaded through the internet 6.

Figure 15:
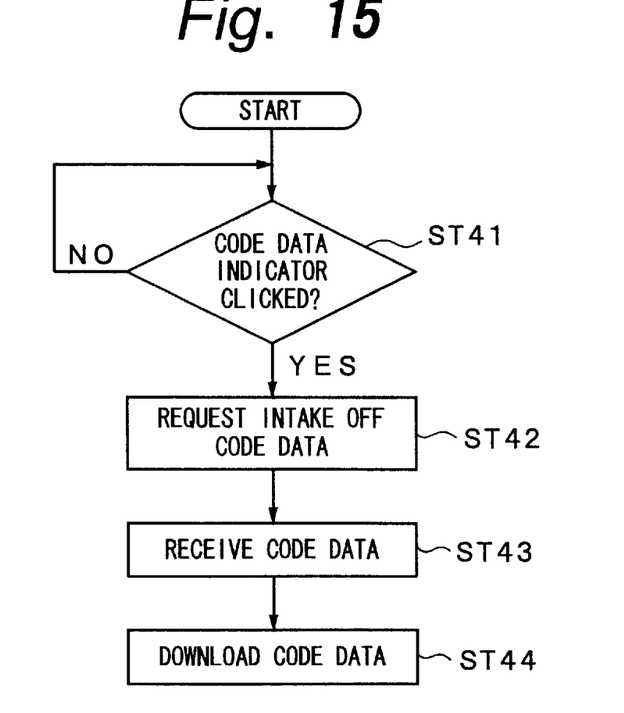
FIG. 15 is a flow chart of a process for down-loading a code data acceptable in a predetermined electronic device of a designated manufacturer by clicking a portion on a table of codes for various kinds of devices of various manufacturers on a display shown in FIG. 14.

FIG. 15 is a flow chart of behaviors taken responsively. As shown in FIG. 15, it is checked whether an indication for setting code data is clicked or not (step ST41). If an indication is clicked, a demand for the corresponding data is output through the internet 6 (step ST42). Then, it is checked whether the code data can be received or not (step 43), and if so, the code data is down-loaded (step ST44).

In this case, each broadcasting station may prepare its own server for supplying code data, or code data may be held in other servers, e.g. those of manufacturers of devices. If code data are held in a server of a manufacturers of the device, selection of VTR of fabricated by the manufacture on a date or in a period of time from the indication 36 is linked to an FTP (File Transfer Protocol) server of the manufacturer. Then, the code data for the electronic device of the manufacturer is down-loaded from the FTP server.

Figure 16:
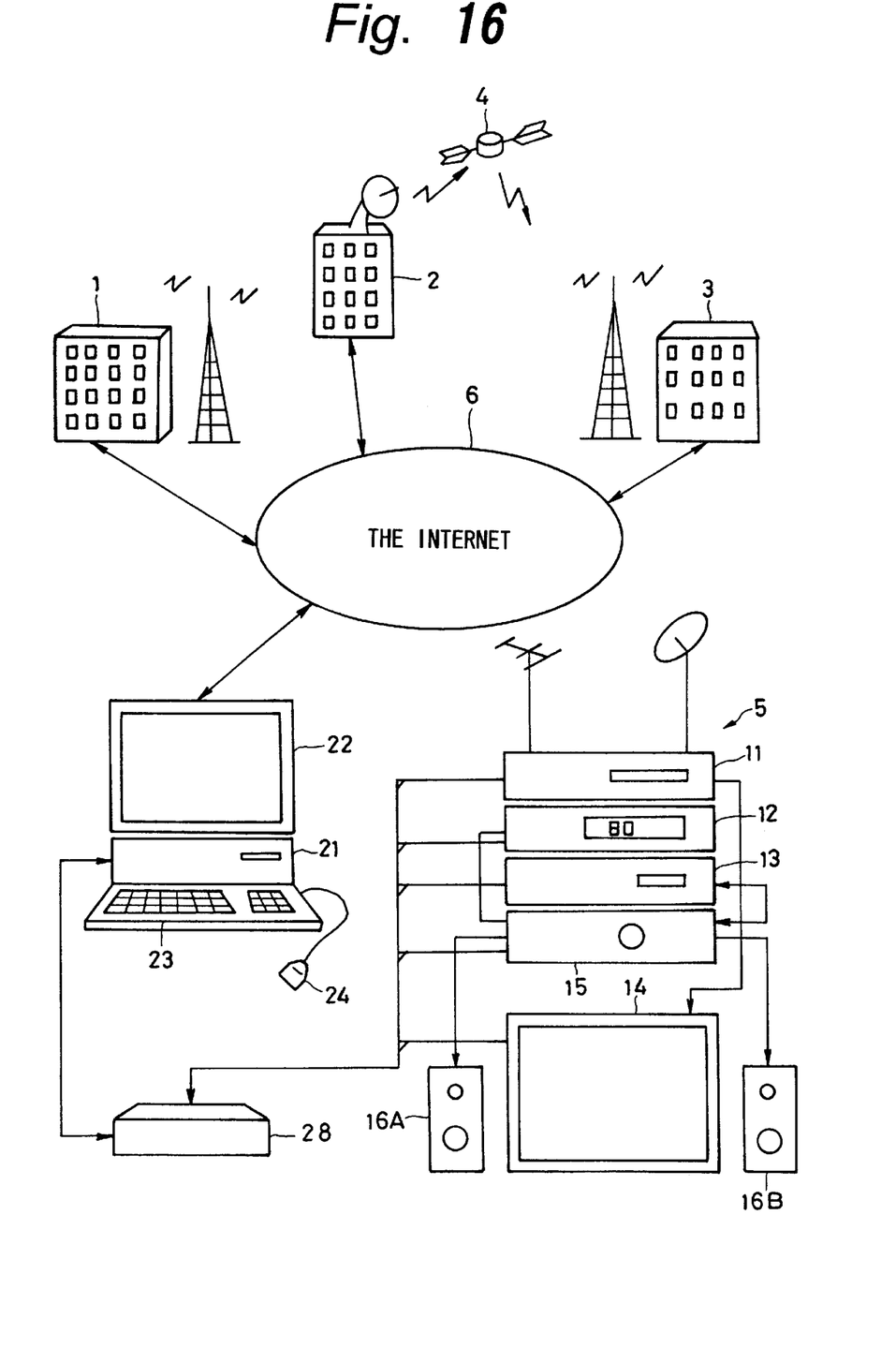
FIG. 16 is a block diagram of the entirety of a network system, taken as a second embodiment of the invention.

Although the example of FIG. 1 has been explained as using infrared rays issued from the interface box 25 to remote-control VRT 11, FM tuner 12, MD player/recorder 13, TV receiver 14, audio amplifier 15, and so on, of the audio/visual system 5, a wired interface box 28 may be used for such remote control as shown in FIG. 16. In this case, the interface box 28 can be reciprocally, bidirectionally connected to the audio/visual system 5 including the personal computer 21, VTR 11, FM tuner 12, MD player/recorder, TV receiver 14, audio amplifier 15, and others.

In this manner, the system according to the invention permits transmission of programs of broadcasting stations 1, 2 and 3 by using WWW services of the internet. The schedule of programs presented by WWW are renewed from time to time if any changes occur in the schedule due to, for example, an extension of time of play-to-play broadcasting of a baseball game, so as to give viewers or listeners the latest information. Additionally, reservation of a program can be done by simply clicking to a corresponding indication of a WWW page as explained above.

As mentioned before, channels have been increased remarkably along with remarkable development of satellite broadcasting and CATV. Under the circumstances, since the internet is an international computer network, by using the internet, it is possible to give viewers or listeners all information on all programs of all channels even when channels increase and service areas extend beyond countries.

The use of the system is not limited to reservation of programs. Because commands for determining behaviors of electronic devices can be easily made by using hypertexts, this system can be widely used also for other purposes.

Figure 17:
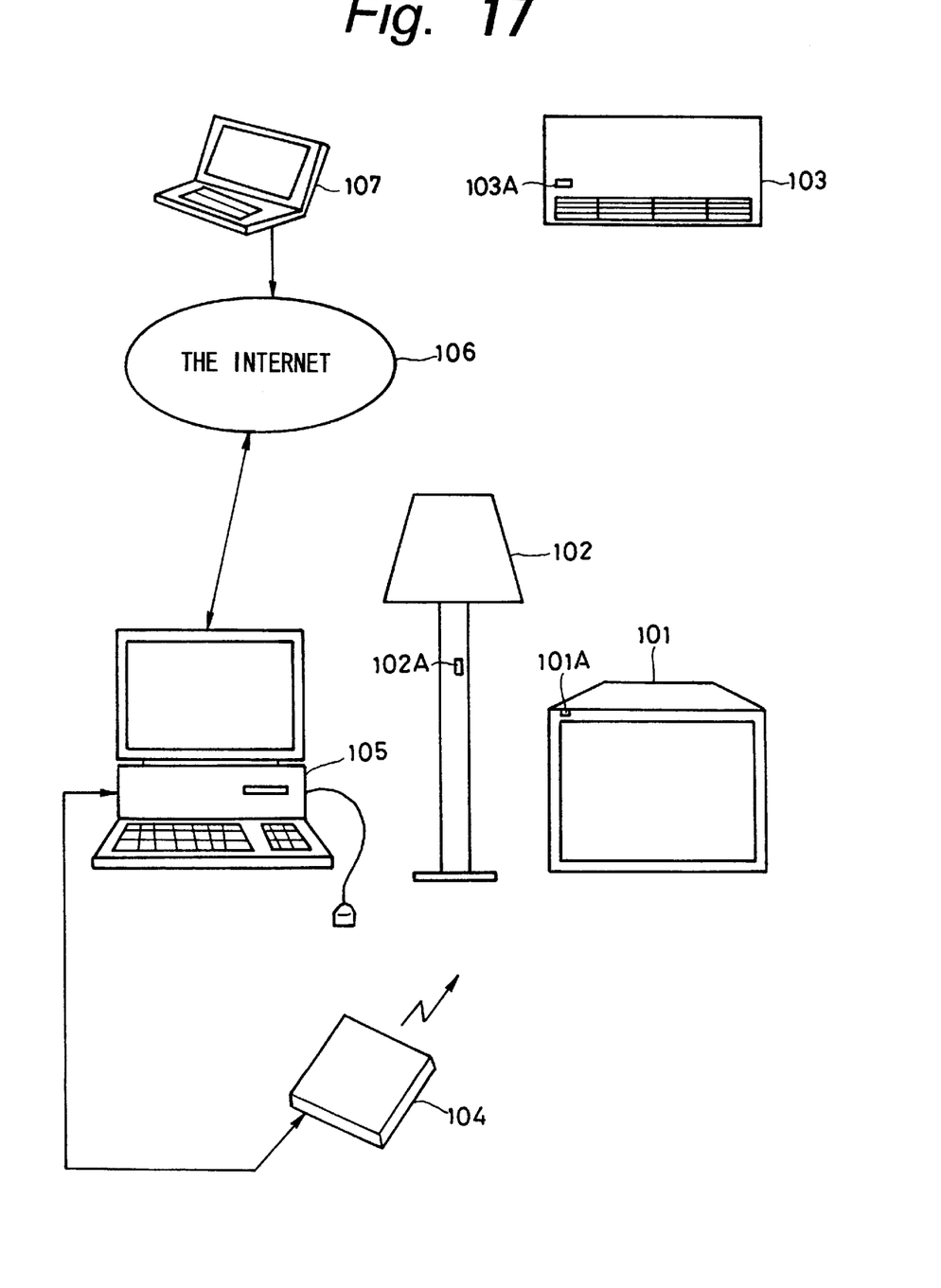
FIG. 17 is a block diagram of the entirety of a network system, taken as a third embodiment of the invention.

FIG. 17 shows an example of the system used for a different purpose. In FIG. 17, numeral 101 denotes a TV receiver, 102 refers to an illuminator, and 103 to an air conditioner. The EV receiver 101, illuminator 102, and air conditioner 103 have optical detectors 101A, 102A and 103A, respectively. They are set in desired mode of operation by infrared signal from an interface box 104 connected to a personal computer 105.

Assume that a user desires to keep a constant cooling effect by the air conditioner and a constant brightness of the illuminator 102. In this case, an optimum value of the cooling effect by the air conditioner 103 and an optimum value of brightness by the illuminator 102 are described as commands in a hypertext, by using the personal computer 105.

In this manner, commands in the hypertext is sent from the personal computer 105 to the interface box 104, and infrared signals responsive to the commands in the hypertext are output from the interface box 104. As a result, the illuminator 102 and the air conditioner 103 can be set for optimum modes of operation.

When the personal computer 105 is connected to an external portable computer 107 through the internet 106, the TV receiver 101, illuminator 102 air conditioner 113, or any other electronic device can be controlled through the external portable computer 107.

More specifically, a hypertext containing a command for setting the TV receiver 101, illuminator 102, or air conditioner 103 in a desired mode of operation is made on the exterior personal computer 107. The hypertext is sent from the exterior portable computer 107 to the personal computer 105 through the internet 106. In receipt of the hypertext, the interface box 104 issues an infrared signal corresponding to the command in the hypertext, and the TV receiver 101, illuminator 102, or air conditioner 103 is set for the desired mode of operation.

According to the invention, information on broadcasting programs is supplied by WWW services of the internet.

Since WWW can transfer information based on a hypertext through the network and can deal with information including not only text data but also image data and audio data, program guides by WWW can present programs not only in characters but also in still or moving images with or without voices. Since the internet is an international computer network system, it is available for all program guides from those of satellite broadcasting for wider service areas beyond countries to those of mini FM stations for very small service areas. Additionally, the use of WWW can present renewed latest program guides.

Moreover, according to the invention, commands for determining behaviors of electronic devices are attached on WWW pages from broadcasting stations. When a portion with a command is clicked, an infrared signal corresponding to the command is transmitted, and a target electronic device is set in a desired mode. As a result, a user can readily attain reservation of a desired program, visually confirming necessary information on a WWW page, for example. Further, since commands for determining behaviors of electronic devices can be put in WWW pages, audio/visual systems or other electronic systems can be collectively controlled by using the commands.

What is claimed is:

1. A remote control device comprising:
   receiving means for receiving program information via a predetermined network; said program information including broadcast schedule information and remote command information related to a plurality of broadcast programs;
   display means for displaying a program menu in accordance with the received program information;
   selecting means for selecting a desired broadcast program from the displayed program menu;
   determining means for determining remote command information corresponding to said desired broadcast program selected by said selecting means;
   converting means for converting the determined remote command information into a remote control signal corresponding to an end-user electronic device;
   memory means for previously storing remote control signals corresponding to a plurality of said end-user electronic devices from different manufacturers; and
   transmitting means for transmitting the remote control signal converted by said converting means to said end-user electronic device.

2. The remote control device according to claim 1, wherein said broadcast schedule information includes at least a start time and a reception channel for said desired broadcast program.

3. The remote control device according to claim 1, wherein said remote command signal includes remote control commands for at least a start time and a reception channel for said desired broadcast program.

4. The remote control device according to claim 1, wherein said predetermined network is the internet.

5. The remote control device according to claim 1, further comprising register means for registering remote command signals corresponding to an end-user electronic device; said converting means converting remote command information in accordance with the registered remote command signals.

6. The remote control device according to claim 1, wherein the remote command information is based upon a program reservation code previously assigned to each broadcast program.

7. The remote control device according to claim 1, wherein said enduser electronic device is a recording device for recording said desired broadcast program.

8. A transmitter/receiver device comprising:

first transmitting means for transmitting program information in response to a request via a predetermined network; said program information including broadcast schedule information and remote command information related to a plurality of broadcast programs;

receiving means for sending said request for program information and for receiving program information transmitted in response to said request via said predetermined network;

display means for displaying a program menu in accordance with the received program information;

selecting means for selecting a desired broadcast program from the displayed program menu;

determining means for determining remote command information corresponding to said desired broadcast program selected by said selecting means;

converting means for converting the determined remote command information into a remote control signal corresponding to an end-user electronic device;

memory means for previously storing remote control signals corresponding to a plurality of said end-user electronic devices from different manufacturers; and second transmitting means for transmitting the remote control signal converted by said converting means to said end-user electronic device.

9. The transmitter/receiver device according to claim 8, wherein said broadcast schedule information includes at least a start time and a reception channel for said desired broadcast program.

10. The transmitter/receiver device according to claim 8, further comprising register means for registering remote command signals corresponding to an end-user electronic device; said converting means converting remote command information in accordance with the registered remote command signals.

11. The transmitter/receiver device according to claim 10, wherein the remote command information is based upon a program reservation code previously assigned to each broadcast program.

12. The transmitter/receiver device according to claim 10, wherein said end-user electronic device is a recording device for recording said desired broadcast program.

13. A transmitting and receiving method comprising the steps of:

receiving program information via a predetermined network in response to a transmitted demand; said program information including broadcast schedule information and remote command information related to a plurality of broadcast programs;

displaying a program menu in accordance with the received program information;

selecting a desired broadcast program from the displayed program menu;

determining remote command information corresponding to said desired broadcast program selected in said selecting step;

converting the determined remote command information into a remote control signal corresponding to an end-user electronic device;

storing remote control signals corresponding to a plurality of said end-user electronic devices from different manufacturers; and transmitting the remote control signal converted by said converting means to said end-user electronic device.

14. The transmitting and receiving method according to claim 13, wherein said broadcast schedule information includes at least a start time and a reception channel for said desired broadcast program.

15. The transmitting and receiving method according to claim 13, further comprising the step of registering remote command signals corresponding to an end-user electronic device; said converting step converting remote command information in accordance with the registered remote command signals.

16. The transmitting and receiving method according to claim 15, wherein said predetermined network is the internet.

17. The transmitting and receiving method according to claim 15, wherein said end-user electronic device is a recording device for recording said desired broadcast program.

\* \* \* \* \*